United States Patent [19]

Tefft et al.

[11] 4,127,245

[45] Nov. 28, 1978

[54] HELICOPTER PITCH RATE FEEDBACK BIAS FOR PITCH AXIS MANEUVERING STABILITY AND LOAD FEEL

[75] Inventors: Franklin A. Tefft, Killingworth; Don L. Adams, Fairfield; Lou S. Cotton, Monroe, all of Conn.

[73] Assignee: United Technologies Corporation, Hartford, Conn.

[21] Appl. No.: 791,622

[22] Filed: Apr. 27, 1977

[51] Int. Cl.² ............................................. B64C 11/34
[52] U.S. Cl. ............................... 244/17.13; 244/83 D; 244/83 E; 244/83 F; 244/83 J; 244/179; 244/181
[58] Field of Search ................ 244/17.13, 83 D, 83 E, 244/83 F, 83 G, 83 H, 83 J, 84, 85, 178, 179, 181, 182; 318/628

[56] References Cited

U.S. PATENT DOCUMENTS

| | | | |
|---|---|---|---|
| 3,482,805 | 12/1969 | Knemeyer | 244/17.13 |
| 3,711,042 | 1/1973 | Rempfer | 244/182 |
| 3,733,039 | 5/1973 | O'Connor | 244/178 |
| 3,833,189 | 9/1974 | Fowler | 244/17.13 |
| 3,920,966 | 11/1975 | Knemeyer | 244/17.13 |

*Primary Examiner*—Trygve M. Blix
*Assistant Examiner*—Reinhard J. Eisenzopf
*Attorney, Agent, or Firm*—M. P. Williams

[57] ABSTRACT

The longitudinal cyclic pitch channel of a helicopter has a negative pitch rate feedback bias added thereto when flying at higher speeds, thereby to stabilize the pitch axis against aft-load maneuvering instability and-/or to induce a requirement for the pilot to provide a countermanding longitudinal cyclic pitch input through his cyclic pitch stick, the normal feed force of which provides an indication to him of the loading of the rotor as a consequence of undergoing pitch rate maneuvers.

6 Claims, 1 Drawing Figure

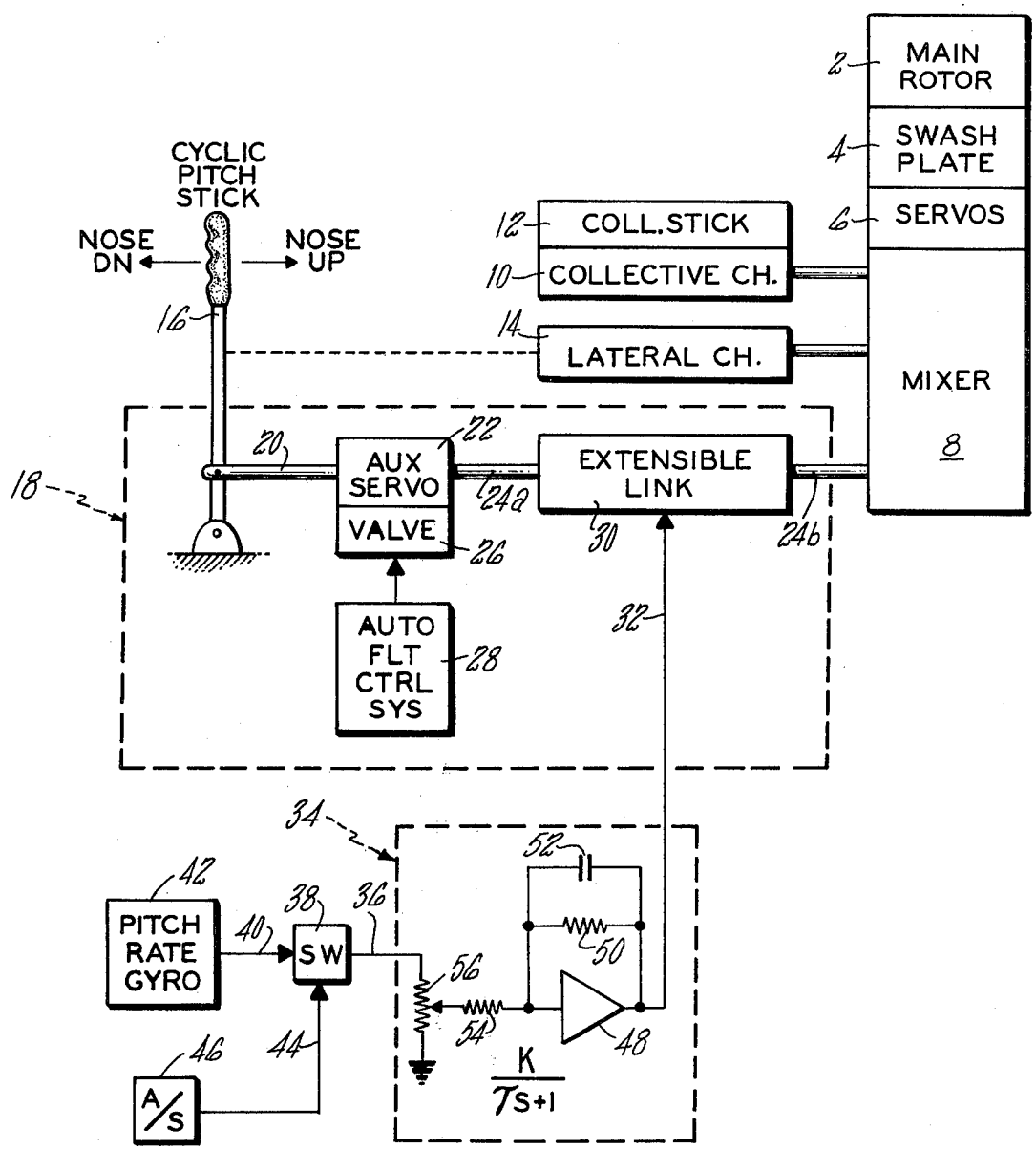

HELICOPTER PITCH RATE FEEDBACK BIAS FOR PITCH AXIS MANEUVERING STABILITY AND LOAD FEEL

The invention disclosed herein was made under or in the course of a contract with the Department of the Navy.

FIELD OF ART

This invention relates to helicopters, and more particularly, to a feedback bias in the longitudinal cyclic pitch channel for improving maneuvering stability.

BACKGROUND OF THE INVENTION

As is known in the art, a helicopter flying at cruise speeds (for instance, in excess of 50 knots) accomplishes turns, for a change in heading, by inducing a bank angle and undergoing a commensurate heading change rate as a function of speed. This maneuver is equivalent to a pull-up maneuver in terms of loads induced in the helicopter, particularly main rotor blade loading. This is due to the force necessarily applied to the helicopter through the blades in order to effect the required directional acceleration against the mass of the helicopter, and in a pull-up, to also overcome the acceleration of gravity. In fact, a 60° level bank angle (which is not uncommon) will nominally double the loading on the main rotor.

As is known, a helicopter has a maneuvering neutral point (which may be thought of as a dynamic center of the helicopter, as far as maneuvers are concerned). When the helicopter is loaded in a fashion that the weight distribution centroid (or center of gravity) is forward of the neutral point, the helicopter is relatively stable in maneuvers. But when the center of gravity is at or aft of the neutral point, the helicopter is relatively unstable in certain maneuvers such as banked turns and pull-ups. This is believed to be due to the fact that the excess weight, aft of the neutral point, tends to rotate around the neutral point whenever the helicopter undergoes any change in direction of flight, much the same as a rear-engine automobile has a greater tendency to skid when in a turn. Consider a pull-up maneuver: as the nose pulls up, the velocity vector of the excess weight aft of the neutral point is no longer in line with the neutral point, so the weight tends to induce a tail-down rotation of the helicopter, so that a commanded nose-up rate is accompanied by an additional weight-induced nose-up rate, which continues until the helicopter resumes straight-line flight (that is, until the velocity vector of the aft weight is through the neutral point again). Also, this undesirable pitch rate may be induced by gusts, etc. Since a banked turn is the same (in the helicopter pitch axis) as a pull-up, the same effect occurs. Thus, a helicopter having excess aft weight is unstable in maneuvering about its pitch axis in pull-ups and banked turns.

In helicopters, any nose-up maneuver loads the main rotor in proportion to the pitch rate, as sensed by the pitch rate gyro. The pitch rate is induced by pulling aft on the cyclic pitch stick, which requires exerting a force on the stick proportional to the displacement thereof. Therefore, the degree of loading of the helicopter as a consequence of a maneuver can be sensed by the feel of the stick. However, when the helicopter has maneuvering instability in its pitch axis, the loading caused by the weight-induced pitch rate is not sensed in the stick. And, if the stick is returned to neutral longitudinal cyclic pitch, the helicopter will still have a weight-induced pitch rate; the only way to remove the weight-induced pitch rate is to go past neutral to command an equal nose-down rate, to return to straight-line flight (in pitch).

Thus, a helicopter with its center of gravity aft of the maneuvering neutral point will respond more than is desired, requiring nose-down (forward) cyclic stick motion to counteract the weight-induced pitch rate. This therefore gives the pilot no feel at all, or an unloading feel. If uncompensated by the pilot's stick motion, any pull-up or turn will grow increasingly tight, called "digging-in", with increasingly dangerous rotor loading, which the pilot cannot feel. Naturally, the effect of the instability is nil at low speeds and increases with speed to the degree that it may be intolerable at high speeds.

SUMMARY OF THE INVENTION

Objects of the invention include improved maneuvering stability of a helicopter, and provision of normal stick feel in a helicopter having maneuvering instability in its pitch axis.

According to the present invention, a signal proportional to pitch rate is provided as a negative feedback bias in the longitudinal cyclic pitch channel of a helicopter in response to the output of a pitch rate gyro. In further accord with the present invention, the pitch bias is provided only at speeds in excess of a predetermined speed (such as cruise speeds). In still further accord with the invention, the magnitude of an automatic negative feedback cyclic pitch bias to the main rotor of the helicopter as a consequence of undergoing a pitch rate may be just enough to restore maneuvering stability, or may be more than that, thereby requiring that the pilot provide an input through the cyclic pitch stick to induce a counteracting nose-up cyclic pitch, whereby the pilot is provided a feel in the cyclic pitch stick which is proportional to the degree of loading of the helicopter rotor.

The invention is readily incorporated into the longitudinal cyclic pitch channel of a helicopter, and may be readily implemented with technologies known in the art.

The foregoing and various other objects, features and advantages of the present invention may become more apparent in the light of the following detailed description of an exemplary embodiment thereof, as illustrated in the accompanying drawing.

DESCRIPTION OF THE DRAWING

The sole FIGURE herein comprises a simplified schematic block diagram of the longitudinal cyclic pitch channel of a helicopter, incorporating the present invention.

DETAILED DESCRIPTION

The cyclic pitch of the main rotor 2 of a helicopter is controlled by a swashplate 4 in response to primary servos 6 as is known in the art. The primary servos 6 relate to the various controllable axes of the swashplate, but are themselves controlled in response to the three pitch channels of the helicopter, which are combined in a mixer 8, all as is known in the art. The mixer 8 is responsive to the collective pitch channel 10, to which pilot inputs are provided through the collective pitch stick 12; it is also responsive to a lateral cyclic pitch channel 14 to which the pilot can supply inputs through a cyclic pitch stick 16. And, a longitudinal cyclic pitch channel 18 is also responsive to the cyclic pitch stick 16.

As is known, the cyclic pitch stick 16 is mechanically connected by suitable linkage 20 to an auxiliary servo 22, the mechanical output of which is applied by suitable linkage 24 to the mixer 8. The auxiliary servo 22 is associated with a valve 26, which in response to an automatic flight control system 28, provides limited authority, dynamic stability augmentation inputs, such as short term aerodynamic damping, into the longitudinal pitch channel by means of the auxiliary servo 22.

The cyclic pitch stick control over the main rotor of the helicopter, as described thus far herein, is all well known in the art and forms no part of the present invention.

According to the invention, the linkage 24 between the auxiliary servo 22 and the mixer 8 has inserted therein, between linkage 24a and linkage 24b, an extensible link actuator 30 which may be a hydraulic actuator or may more commonly comprise an electromechanical actuator, such as a reversible motor driving a jack screw, as is known in the art. In any event, the extensible link 30 responds to a signal on a line 32 provided by a proportionate, lagged amplifier 34 to cause the extensible link 30 to either extend or retract, thereby to either add or subtract longitudinal cyclic pitch bias to the longitudinal cyclic pitch command which otherwise would be provided by the auxiliary servo 22, through the linkages 24a, 24b to the mixer 8. The amplifier 34 is connected by a lead 36 through a switch 38 to the output 40 of a pitch rate gyro 42. The switch 38 is closed above a predetermined airspeed, such as 60 knots, as determined by a signal on a line 44 from an airspeed sensing transducer 46; or, alternatively, the switch 38 may be a pressure actuated switch connected directly to the pitot-static system of the aircraft.

The amplifier 34 may typically comprise a high gain amplifier 48 (sometimes referred to as an operational amplifier) having a resistor 50 and a capacitor 52 connected in feedback therewith, and a resistor 54 at the input fed by a gain adjusting potentiometer 56 connected thereto, in a well known fashion. The capacitor 52 in the feedback path causes the amplifier 34 to be a lag or integrating amplifier, thereby to provide low pass filtering to the pitch rate gyro signal provided thereto on the lead 36. The potentiometer 56 allows proportional control over the overall gain of the amplifier 34, whereby the amount of longitudinal cyclic pitch bias, provided by the extensible link 30 for any given rate of turn, can be adjusted by technicians to provide a proper amount of feel for any given aircraft, as desired. The sense (or polarity) of signal on the line 32 is chosen with respect to the extensible link 30 so as to provide negative feedback bias; that is, a nose-down pitch rate causes nose-up cyclic pitch input to the extensible link 30.

At low speeds, the loading of the structural envelope of the helicopter is not affected greatly by the pitch rate; similarly, there is a lesser effect of pitch axis maneuvering instability at low speeds. Thus, the structural need for a rotor load indication in the feel of the cyclic stick and the need for pitch rate negative longitudinal cyclic pitch feedback to compensate for maneuvering instability, are both conveniently reduced at lower speeds. This indicates that the invention herein should be used only at higher flight speeds, which is assured by provision of the airspeed switch 38, as described hereinbefore. As is known, the output of the pitch rate gyro in a turn is a function of the sine of the bank angle times the rate of heading change (which is, in turn, inversely dependent on speed). For instance, if the pilot were to induce (hypothetically) a 90° bank angle, all of the heading change rate would show up as pitch rate. But at realistic bank angles, the heading change rate is modified by the sine of the bank angle to produce commensurately lower pitch rates. And pull-ups also require loading to offset the acceleration of gravity. The degree of desired feedback bias to be induced by the extensible link 30 into the longitudinal cyclic pitch channel is readily adjusted to accommodate these factors by the potentiometer 56, for any given helicopter type, so as to provide maneuvering stability in the pitch axis and perhaps also require the pilot to pull back on the cyclic pitch stick in banked turns, thereby to partially offset the feedback input into the longitudinal cyclic pitch channel to compensate for the nose-down bias input thereto. Since the degree of cyclic pitch stick motion is indicated by a proportional, countermanding force in the stick (the more the stick is pulled back, the greater the force required to do so), the pilot can get an indication of the structural severity of a banked turn. This therefore restores to the pilot a cyclic pitch stick feel of the magnitude of a turn or pull-up maneuver, and the commensurate loading of the helicopter, even though the helicopter has latent maneuvering instability in the pitch axis.

In operation, when the helicopter is banked over for a turn by lateral motion of the cyclic pitch stick 16 (into or out of the paper as seen in the drawing), the pitch rate gyro 42 will provide (at high speeds) a signal through the amplifier 34 to cause the extensible link 30 to retract, whereby the aircraft will tend to nose-down. Sensing this, and initiating a response primarily from habit, the pilot will pull back on the cyclic pitch stick 16 so as to move the auxiliary servo 22 by a commensurate amount. In perfect response, the amount of nose-down provided by the extensible link 30 to the linkage 24b will be totally compensated by an equal and opposite nose-up motion provided to the linkage 24a by the servo 22 in response to motion of the cyclic pitch stick 16, so that the helicopter as a whole does not even know that it has happened, the sole result being that the pilot has been forced to provide a nose-up stick input to give him a feel of the magnitude of the turn. Similarly, in a pull-up, the bias counteracts the weight-induced rate, and the pilot can feel the rate of pull-up which he is inducing through the cyclic pitch stick.

In the embodiment shown in the drawing, the extensible link 30 comprises a means for altering the longitudinal cyclic pitch command provided by the longitudinal cyclic pitch channel, in its control over the main rotor. The embodiment shown therefore provides direct, positive control in the longitudinal cyclic pitch channel. As an alternative, it may be possible to provide a signal proportional to the output of the pitch rate gyro as one of the inputs to the valve 26, which is normally controlled only by relatively limited authority (which may be on the order of ±10% of full authority) over the auxiliary servo 22, required for dynamic stability. Since it is desired to maintain a low, limited level of authority insofar as the dynamic stability augmentation inputs from the automatic flight control system 28 are concerned, it may be difficult to provide a full range of longitudinal cyclic pitch bias for maneuvering stability, in accordance with the invention, in such a limited authority input. But, depending upon the particular manner in which the longitudinal cyclic pitch channel is implemented in any given helicopter, equivalent negative pitch feedback to that described herein may be provided electrically, as an input to the auxiliary servo, or in any other fashion consistent with the precepts of the invention.

Thus, although the invention has been shown and described with respect to an exemplary embodiment thereof, it should be understood by those skilled in the art that the foregoing and various other changes, omissions and additions may be made therein and thereto, without departing from the spirit and the scope of the invention.

Having thus described a typical embodiment of our invention, that which we claim as new and desire to secure by Letters Patent of the United States is:

1. A helicopter having a main rotor and controls therefor including a longitudinal cyclic pitch channel responsive to a pilot's cyclic pitch stick to provide a longitudinal cyclic pitch command input to the main rotor controls, in which the improvement comprises:
    a pitch rate gyro having an output indicative of rotation in the pitch axis of the helicopter; and
    bias means associated with said longitudinal cyclic pitch channel and connected for response to the output of said pitch rate gyro to alter the longitudinal cyclic pitch command provided by said cyclic pitch channel by an amount proportional to the output of said pitch rate gyro in a direction to oppose the sensed pitch rate.

2. A helicopter according to claim 1 in which said bias means includes an airspeed responsive switch means for rendering said bias means responsive to said pitch rate gyro only at airspeeds in excess of a predetermined speed.

3. A helicopter according to claim 1 wherein said bias means includes adjustable means for varying the amount by which said bias means alters the longitudinal cyclic pitch command provided by said longitudinal cyclic pitch channel in response to the output of said pitch rate gyro.

4. A helicopter according to claim 1 wherein said bias means includes an amplifier having a lag characteristic, thereby to provide low pass filtering of the output of said pitch rate gyro applied to said longitudinal cyclic pitch channel.

5. In a method of controlling a helicopter in banked turns so as to provide an indication of the magnitude of load induced in the helicopter as a consequence of making the banked turn, the steps of:
    providing a bias input to the longitudinal cyclic pitch channel of the helicopter to induce a nose-down longitudinal cyclic pitch command segment as a consequence of undergoing a banked turn; and
    moving the pilot's cyclic pitch stick in a direction so as to cause said longitudinal channel to induce a nose-up longitudinal cyclic pitch input command segment substantially compensating the nose-down longitudinal cyclic pitch command bias segment, whereby the normal feel of the cyclic stick provides to the pilot a qualitative indication of the severity of aircraft loading induced by the banked turn.

6. A method according to claim 5 wherein said providing and moving steps are performed only at speeds in excess of a predetermined speed.

* * * * *

UNITED STATES PATENT AND TRADEMARK OFFICE
CERTIFICATE OF CORRECTION

PATENT NO. : 4,127,245
DATED : November 28, 1978
INVENTOR(S) : Franklin A. Tefft, Don L. Adams, Lou S. Cotton It is certified that error appears in the above—identified patent and that said Letters Patent are hereby corrected as shown below:

Abstract, line 8    "feed" should read --feel--

Signed and Sealed this

Fifth Day of June 1979

[SEAL]

Attest:

RUTH C. MASON
*Attesting Officer*

DONALD W. BANNER
*Commissioner of Patents and Trademarks*

Disclaimer 4,127,245.—*Franklin A. Tefft*, Killingworth, *Don L. Adams*, Fairfield and *Lou S. Cotton*, Monroe, Conn. HELICOPTER PITCH RATE FEEDBACK BIAS FOR PITCH AXIS MANEUVERING STABILITY AND LOAD FEEL. Patent dated Nov. 28, 1978. Disclaimer filed Feb. 4, 1980, by the assignee, *United Technologies Corporation*.

Hereby enters this disclaimer to claims 1 through 5 of said patent.

[*Official Gazette, May 20, 1980.*]